United States Patent [19]

Litschel

[11] Patent Number: 5,627,566
[45] Date of Patent: May 6, 1997

[54] KEYBOARD

[76] Inventor: Dietmar Litschel, Käferkreuzg. 37, Klosterneuburg, Austria, 3400

[21] Appl. No.: 157,169
[22] PCT Filed: Jun. 9, 1992
[86] PCT No.: PCT/AT92/00073
§ 371 Date: Dec. 6, 1993
§ 102(e) Date: Dec. 6, 1993
[87] PCT Pub. No.: WO92/21519
PCT Pub. Date: Dec. 10, 1992

[30] Foreign Application Priority Data

Jun. 6, 1991 [AT] Austria ................... 1148/91

[51] Int. Cl.⁶ ........................................ G09G 5/00
[52] U.S. Cl. ................................ 345/168; 345/172
[58] Field of Search ........................... 345/168, 174, 345/169, 172, 156; 341/22, 21, 34; 178/18; 400/473, 477, 483, 489, 87, 100, 485; 200/5 A, 5 R; 434/112–117; 84/743

[56] References Cited

U.S. PATENT DOCUMENTS

| | | |
|---|---|---|
| 3,969,595 | 7/1976 | Johnson . |
| 4,042,777 | 8/1977 | Bequaert et al. . |
| 4,215,490 | 8/1980 | Fewell ........................ 434/114 |
| 4,425,484 | 1/1984 | Fukukura ...................... 200/5 A |
| 4,655,621 | 4/1987 | Holden ......................... 400/100 |
| 4,659,881 | 4/1987 | Dowe ........................... 200/5 R |
| 4,680,577 | 7/1987 | Straayer et al. ............... 345/168 |
| 4,769,516 | 9/1988 | Allen ........................... 200/5 R |
| 4,775,255 | 10/1988 | Langley ....................... 400/100 |
| 4,795,888 | 1/1989 | MacFarlane .................. 400/473 |
| 4,833,446 | 5/1989 | Eilam et al. .................. 341/22 |
| 4,849,732 | 7/1989 | Dolenc . |
| 4,927,987 | 5/1990 | Kirchgessner ................ 200/5 R |
| 5,007,008 | 4/1991 | Beers ........................... 341/22 |
| 5,017,030 | 5/1991 | Crews ........................... 400/485 |
| 5,025,705 | 6/1991 | Raskin .......................... 84/743 |
| 5,053,585 | 10/1991 | Yaniger ........................ 178/18 |
| 5,178,477 | 1/1993 | Gambaro ...................... 400/489 |
| 5,189,403 | 2/1993 | Franz et al. .................. 400/489 |
| 5,189,416 | 2/1993 | Estes ............................ 341/22 |
| 5,231,386 | 7/1993 | Brandenburg et al. ....... 345/174 |
| 5,269,004 | 12/1993 | Comerford et al. .......... 345/168 |
| 5,361,083 | 11/1994 | Pollack . |

FOREIGN PATENT DOCUMENTS 2916790 11/1980 Germany .
3108028 11/1983 Germany .

*Primary Examiner*—Steven Saras
*Attorney, Agent, or Firm*—Broadbent, Hulse, Pierce & Pate

[57] ABSTRACT

A keyboard apparatus having keys selectively interacting with actuation members to provide a preliminary evaluation of a character before actual input of the character is disclosed in one preferred embodiment of the present invention as including at least one key, a triggering unit operably disposed in connection with the key, and sensors arranged on the key. Preferably, the key of the present invention includes at least two selectively actuated sensors which interact with a device, such as, for example, a display or an acoustic indicating arrangement, for generating sound or visible output signals, whereby each sensor generates a different signal. In operation, a response behavior is provided by actuation of the sensors which is different from that of the triggering unit in order to make it possible to provide a preliminary display of the signal before a final input of the signal is triggered.

16 Claims, 8 Drawing Sheets

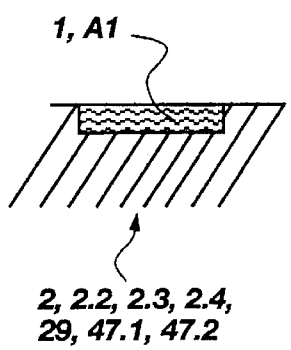
2, 2.2, 2.3, 2.4,
29, 47.1, 47.2
*Fig. 1.1*
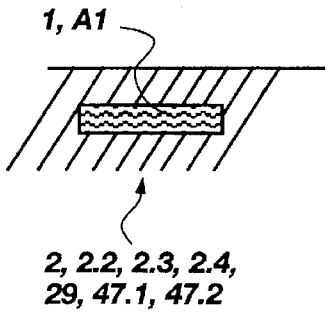
2, 2.2, 2.3, 2.4,
29, 47.1, 47.2
*Fig. 1.2*
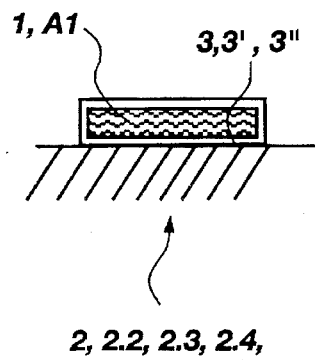
2, 2.2, 2.3, 2.4,
29, 47.1, 47.2
*Fig. 1.3*
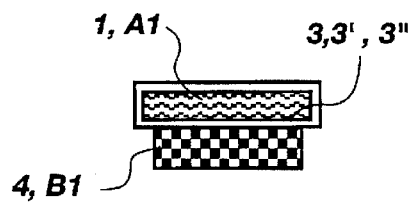
*Fig. 1.4*
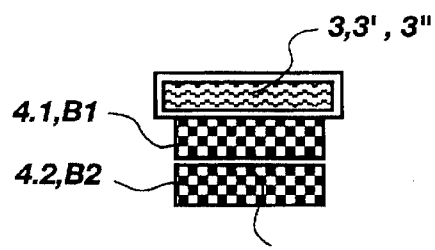
*Fig. 1.5*
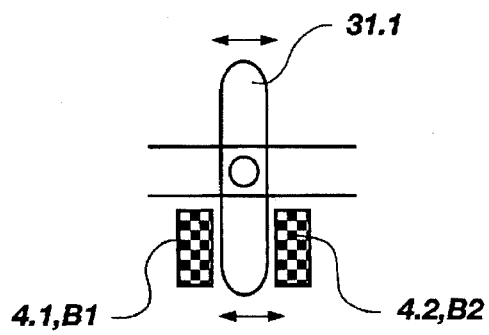
*Fig. 2.1*
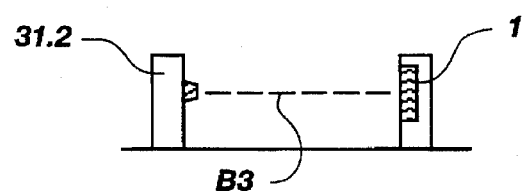
*Fig. 2.2*

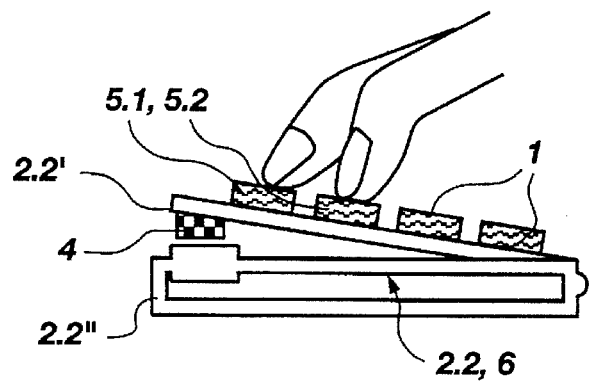
Fig. 3.1
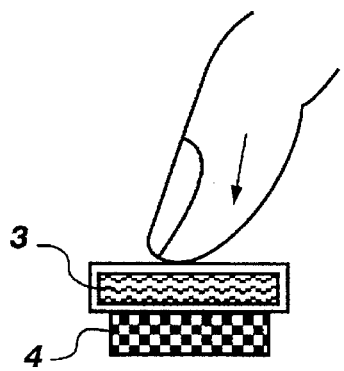
Fig. 4.1
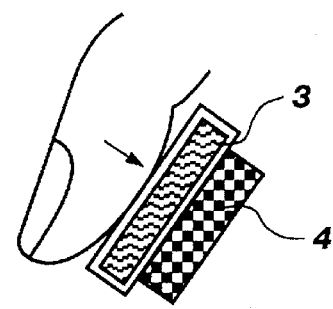
Fig. 4.2
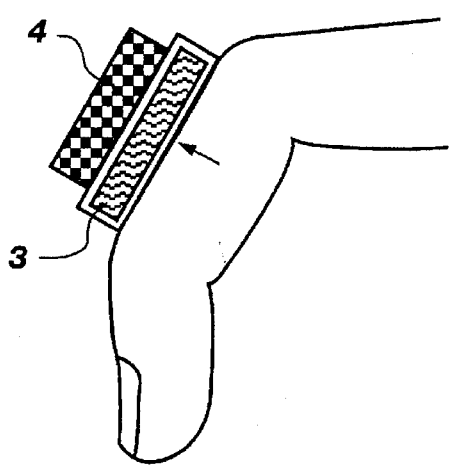
Fig. 4.3
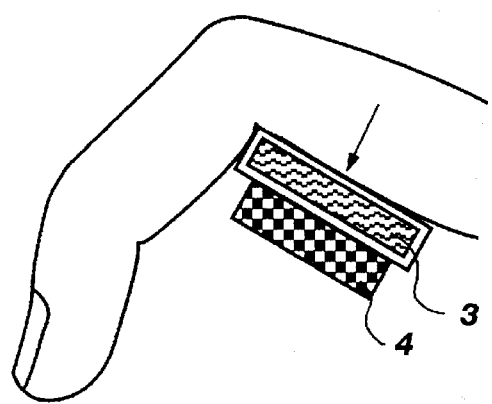
Fig. 4.4

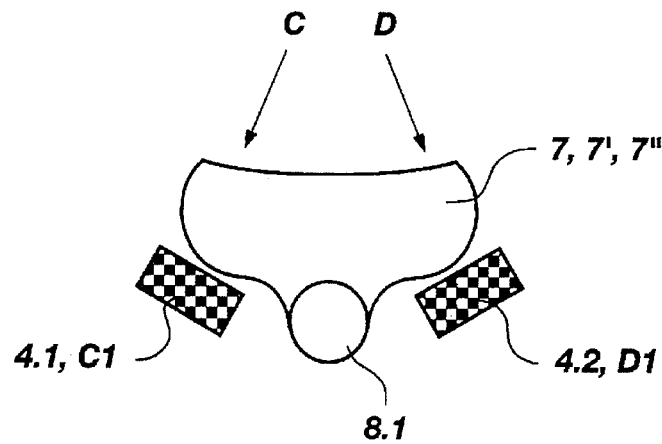
Fig. 5.1
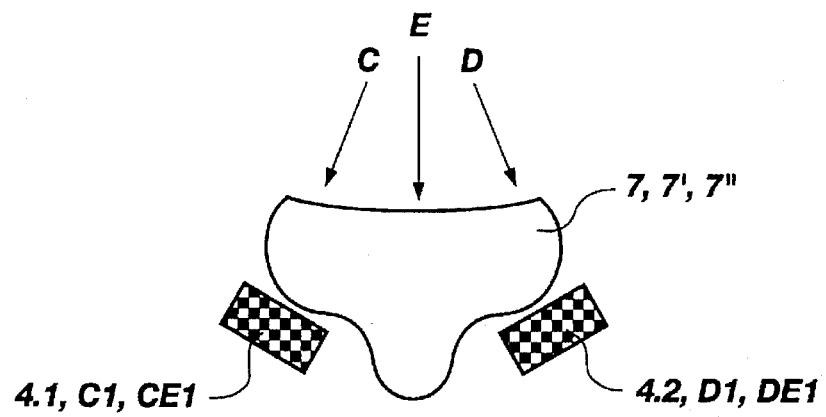
Fig. 5.2
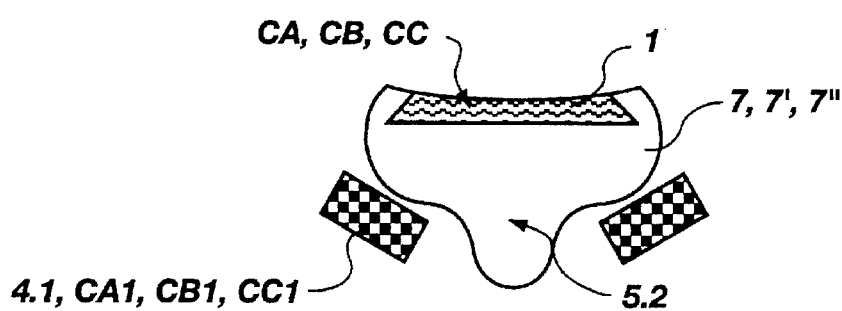
Fig. 5.3

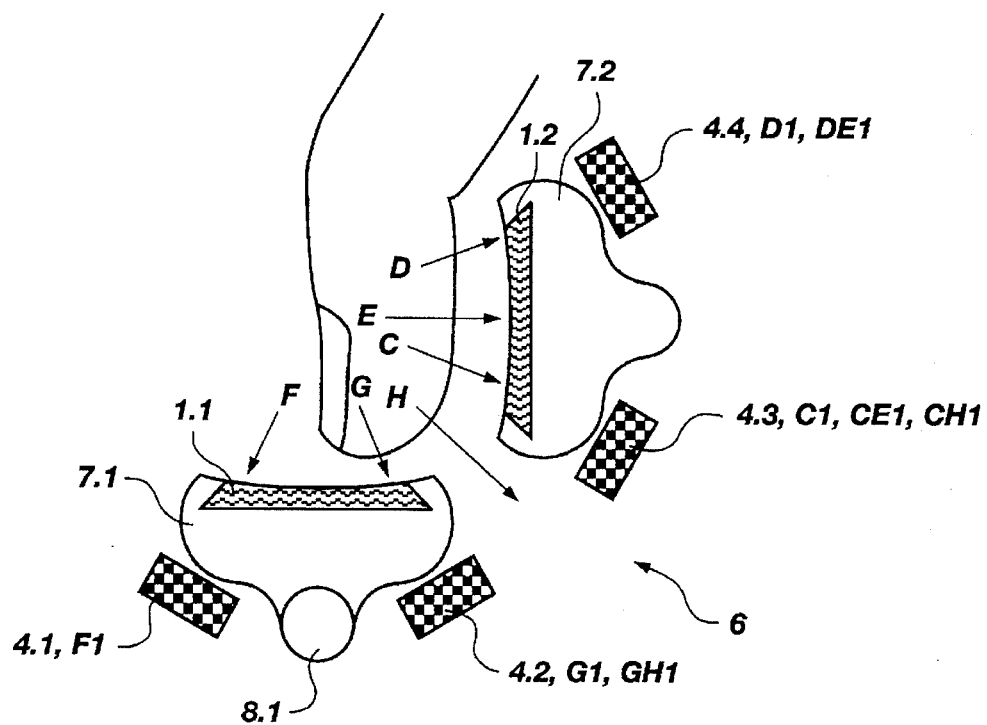
Fig. 6.1
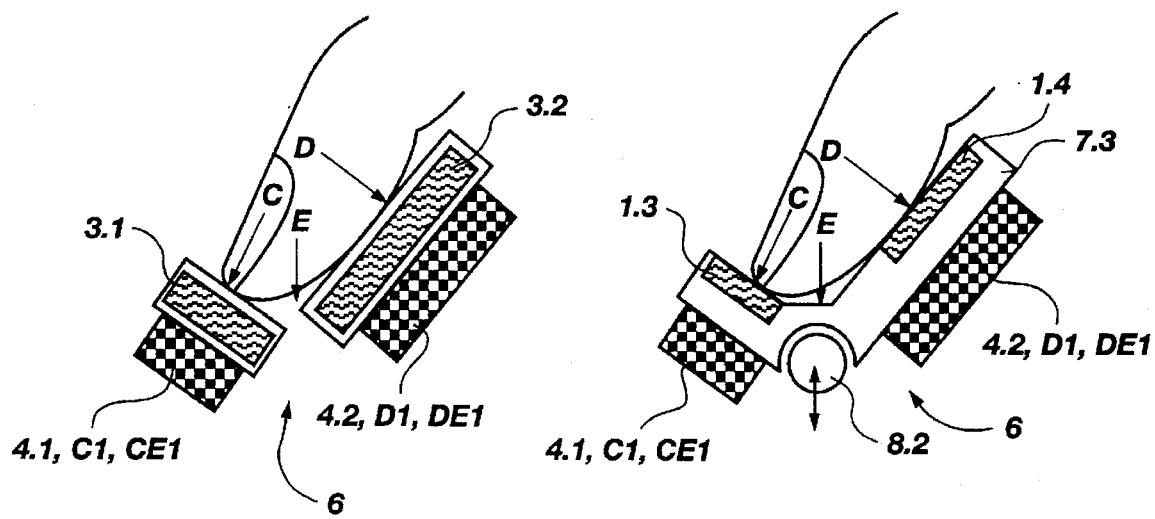
Fig. 6.2          Fig. 6.3

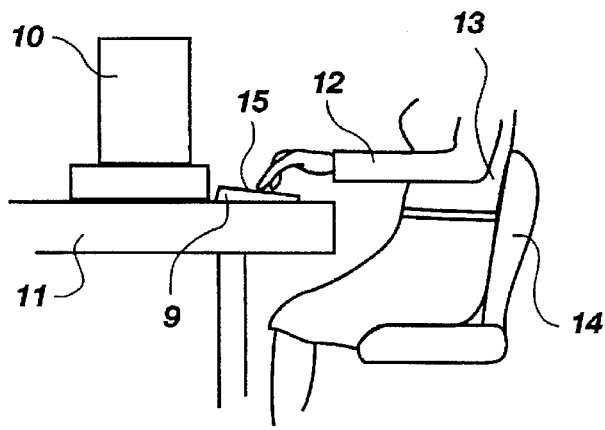
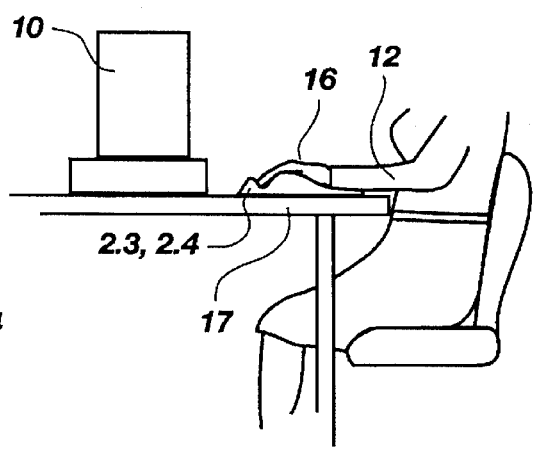
*Fig. 7.1*  *Fig. 7.2*
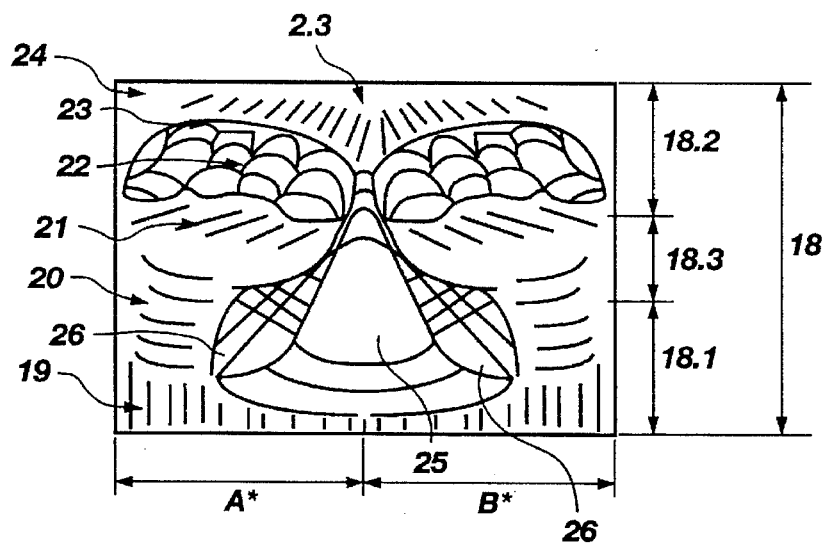
*Fig. 8.1*
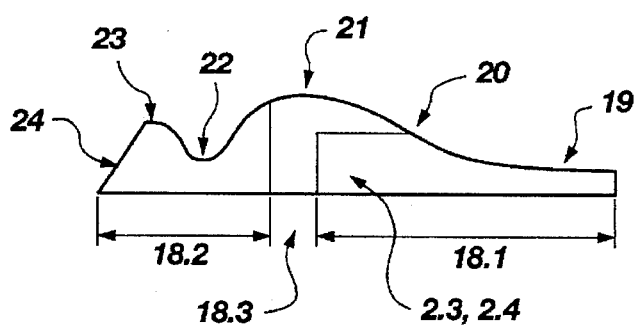
*Fig. 8.2*

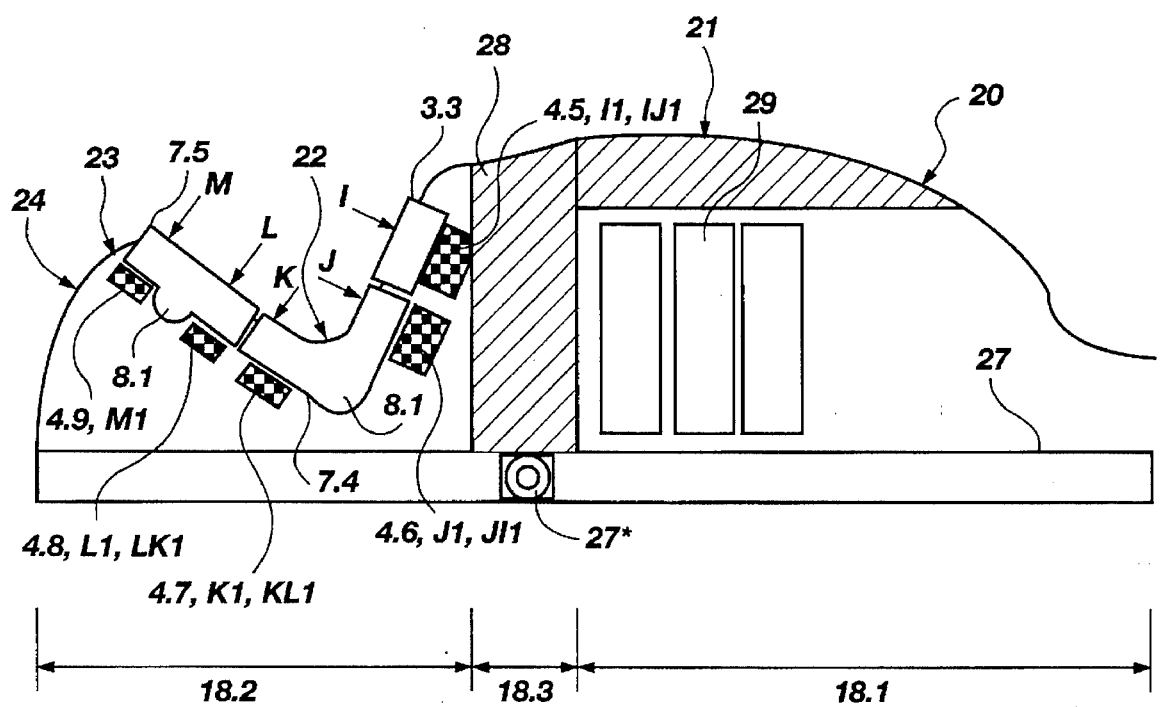
Fig. 8.3
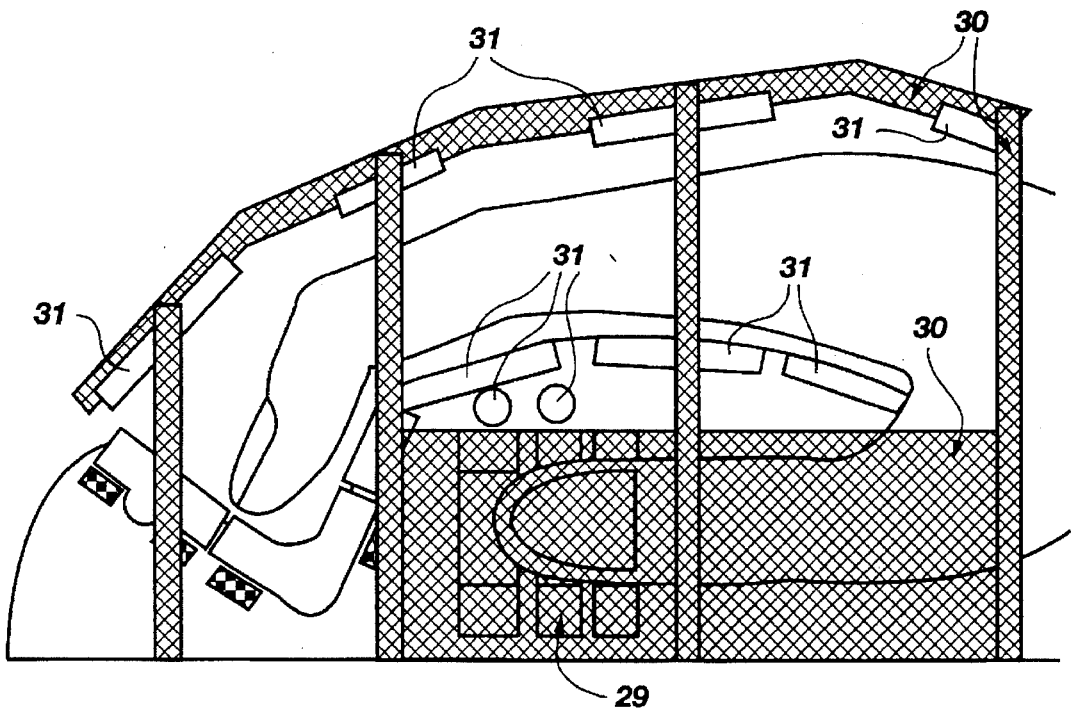
Fig. 8.4

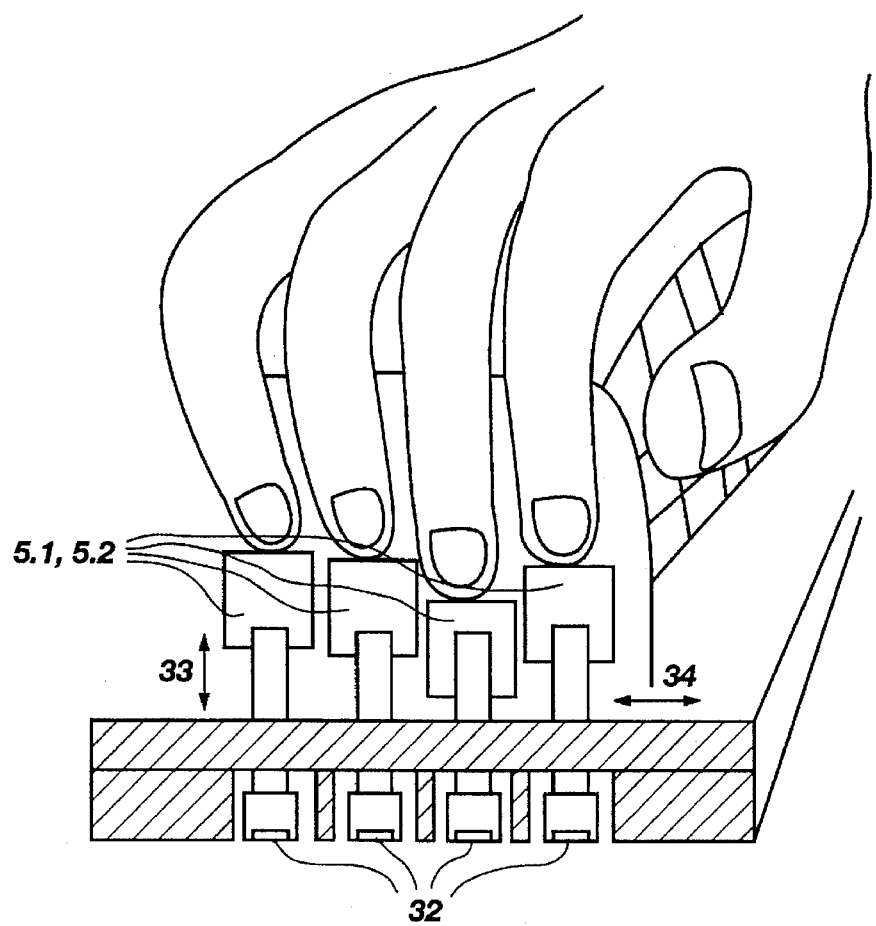
Fig. 8.5
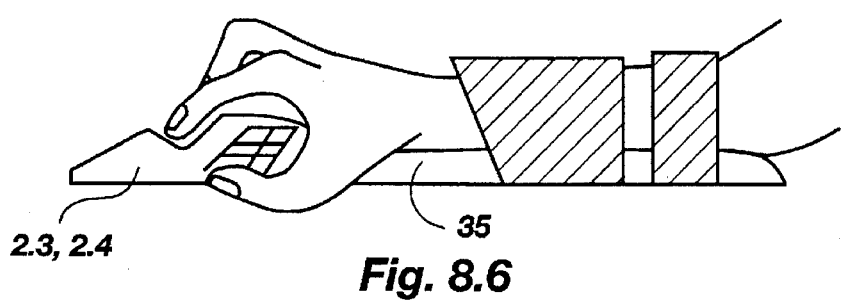
Fig. 8.6
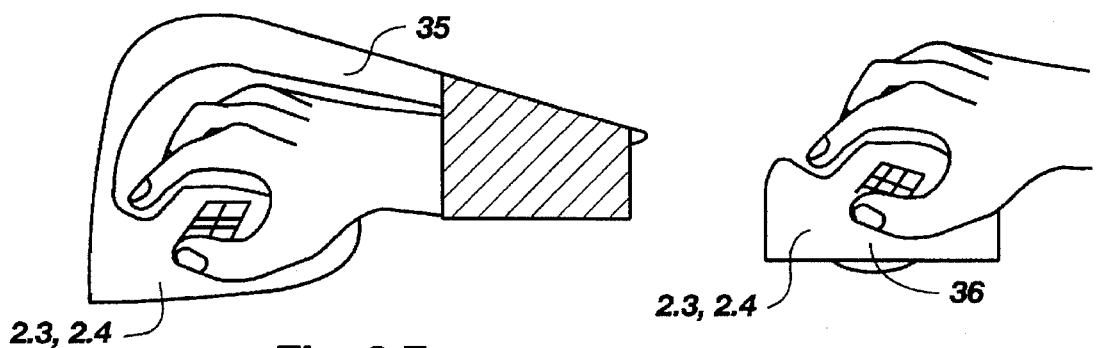
Fig. 8.7     Fig. 8.8

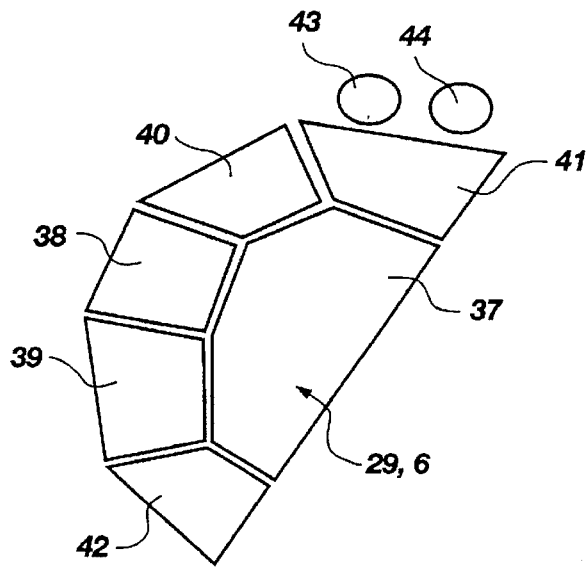
Fig. 8.9
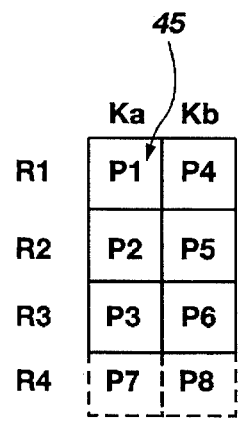
Fig. 9.1
(PRIOR ART)
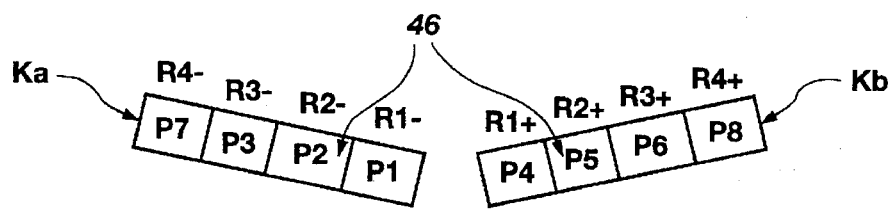
Fig. 9.2
(PRIOR ART)
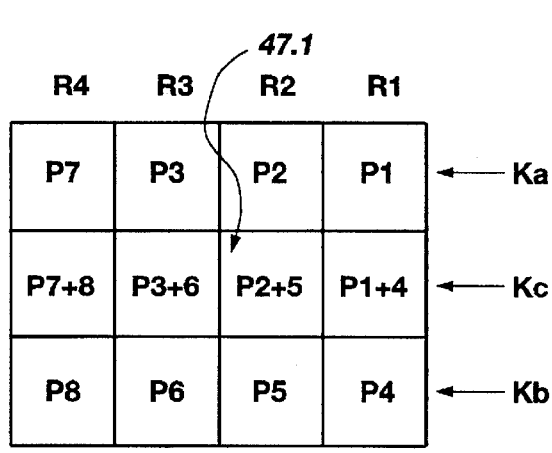
Fig. 9.3
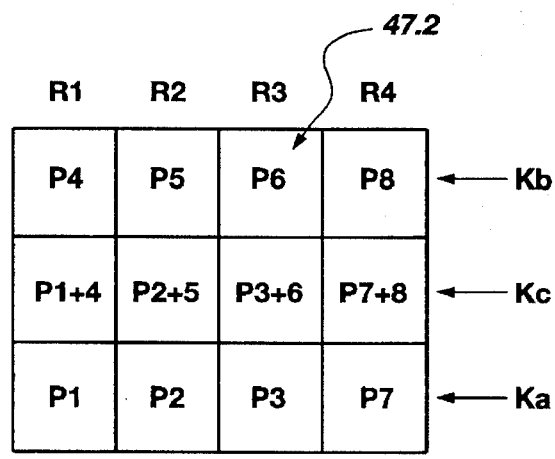
Fig. 9.4

KEYBOARD

THE FIELD OF THE INVENTION

The invention relates to a keyboard with at least one key and a triggering unit which is connected with the key.

THE BACKGROUND ART

Of the known keyboards, in particular, that of the typewriter is to be emphasized. According to the arrangement of the letters on the upper left row of letters, this area is called in the English language the QWERTY-keyboard, in the computer language the ASCII keyboard (hereinafter either QWERTZ or ASCII keyboard). Especially advantageous is the inputting (typing-in or striking) according to the ten-finger system, which can be executed by the experienced typist without eye contact to the keys. It is also advantageous that the QWERTZ keyboard is a matter of a world-wide standardized keyboard, which is economically accessible. The disadvantage of the QWERTZ keyboard is that it is relatively voluminous and requires a fixed support surface. Furthermore, its use is associated with a relatively high physical exertion. This keyboard is regarded in the meantime as so far matured that its efficiency can now be only slightly further improved.

Further, keyboards are known with which for every stroke two sequential steps are required: First of all, the sensor present on the particular key must be touched. The proper input then occurs by thumb pressure on a central input key. It is disadvantageous, further, that to reach the sensor there are necessary lateral movements of the fingers, for which there are not favorable natural predispositions.

Also with the one-hand keyboard described in U.S. Pat. No. 4,042,777, a chord stroke (Akkordanschlag) is possible, in which the index, middle and ring finger(s) are used. On two full and two half rows of keys there are represented three rows of letters with the whole alphabet. While the upper and lower row, as seen from the operator, have nine letters, the middle one has eight. With this keyboard, the key spacings of the unshortened keyboard are very severely compressed in the rows, in order to make it possible to use the keyboard with one hand. Ten keys consist of one unit of their own, thirteen of two key halves each and three of four key quarters. What is disadvantageous is that the number of strokes to be executed by one finger is very high and the fingers frequently have to be spread and moved laterally. A reduction of the number of keys on the keyboard surface is not provided.

From U.S. Pat. No. 4,849,732 there is known a keyboard with which for each finger there is provided a multifunction key. Depending on the place of the stroke, there are different character (Zeichen) which can be generated. With such a known device, however, it is disadvantageous that it is only after the stroke that a possible wrong operation can be recognized. If, for example, such a keyboard is provided as a computer input device, then the user can detect the wrong input only by the appearance of the wrong character on the picture screen, and he has to correct it in a complicated manner.

BRIEF SUMMARY AND OBJECTS OF THE INVENTION

An object of the invention is to avoid these disadvantages and to create a keyboard with which, before the final actuation of a key, it is possible to ascertain which key is concerned.

A further object of the present invention is to create a keyboard with which multiple actuatable keys are provided and with which the correctness of an intended input is recognizable before the final execution of this input. It is essential here that the user does not have to depend on the observation of the fingers for this control check.

This problem is solved by arranging sensors on the key. Here there are provided as many sensors as different characters are generatable with actuation of the key. In use, it is possible first to address one of the sensors and therewith to obtain a preliminary display of the signal or character concerned. If this character is the intended one, then by actuation of the triggering unit the actual input of this character can be achieved. In the simplest keys, this occurs through the fact that the pressure point of the sensors and that of the triggering unit are different. A light touching of a sensor, therefore, at first triggers only the preliminary display, which then, by a stronger pressure of the finger can be converted into a final input. The preliminary display or final input can occur acoustically or optically.

It is also possible, however, to carry out other stroke concepts with the sensors. Thus, for example, it is thinkable that the sensors react to finger pressure, whereas the triggering unit is released only on removal of the finger from the key. For the user, it is possible to identify the correct character on the key and find the corresponding sensor for the character(s), by lifting off of the finger to bring about the input of just this character.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIGS. 1.1–1.3 show possible schematic arrangements of the sensor in the keyboard;

FIG. 1.4 shows a key according to the invention which has, besides a sensor, also a triggering unit;

FIG. 1.5 shows a key with sensor and triggering units arranged one over the other;

FIG. 2.1 shows a lever, which on actuation to the right activates the sensor, on actuation to the left activates the triggering unit;

FIG. 2.2 shows a light barrier, light, and sensor;

FIG. 3.1 shows the chord keyboard on which with a single chord stroke several characters can be struck;

FIGS. 4.1–4.4 show by way of example how the keys are pressed with different members of the fingers and the triggering units are struck in this manner;

FIGS. 5.1–5.3 show by way of example a multiway key in arbitrary execution, such as a key having a rigid anchoring and two triggering units;

FIGS. 6.1–6.3 show by way of example the concerted acting of two keys for the realization of a certain stroke concept which allows various-type formation possibilities;

FIG. 7.1 shows the use of the OWERTZ keyboard with a picture screen;

FIG. 7.2 shows the use of relief keyboards according to the present invention, into which the hand of the user may be embedded;

FIG. 8.1 shows a two-handed relief keyboard;

FIG. 8.2 shows a section through the two relief keyboards which have at their disposal a front part, a rear part, and an intermediate part;

FIG. 8.3 shows an enlarged and more-detailed representation of the relief keyboards according to FIG. 8.2;

FIG. 8.4 shows the same relief keyboards over which there is located a casing in arbitrary execution;

FIG. 8.5 shows details in the relief keyboards from in front and in section and illustrates their device for adjusting the key unit in height and width;

FIGS. 8.6 and 8.7 show executions of a relief keyboard which requires no additional support surface since it has at its disposal a bar or any other such device which can be fixed on the arms of the user;

FIG. 8.8 shows another such execution of the relief keyboard which is combined with a computer mouse;

FIG. 8.9 shows the thumb keyboard which in the two-hand relief keyboard is preferably located on the lateral boundary of the recess and in the one-hand relief keyboard in vertical or oblique arrangement preferably at the lateral end of this keyboard;

FIG. 9.1 shows the structure of the braille script in its usual variations;

FIG. 9.2 shows the arrangement of the braille keys in a conventional braille keyboard to be operated with both hands; and FIGS. 9.3 and 9.4 show the key or stroke arrangement of one presently preferred embodiment of the present invention for a one-hand braille keyboard for left handers and right handers.

DETAILED DESCRIPTION OF THE PREFERRED EMBODIMENTS

The invention is explained in detail with the aid of examples of execution represented in the figures. FIG. 1.1 to FIG. 1.5 show schematical possible arrangements of the sensor 1 in the keyboard 2. Further keyboards 2 are the chord keyboard 2.2, the both hand relief keyboard 2.3, the one-hand relief keyboard 2.4, the thumb keyboard 29, the one-hand braille keyboard for left-handers 47.1 and the one-hand braille keyboard for right-handers 47.2. The sensor 1 can be a temperature, contact pressure, moisture, magnetic, optical or other sensor and have a different execution, size and performance capacity and be mounted in an arbitrary place on the keyboard 2, thus also in the casing 31 and the key 3. The key 3 is a simple key in arbitrary execution and used as a generic term to include all other simple keys. Key 3' is a character key. With the character key 3' there are activated or struck characters, such as, for example, letters, braille points and digits as well as syllables and words. Key 3" is a function key. Function keys 3" are keys which serve for the control and the efficient use of the keyboard 2, such as, for example, the switch-over key or the tabulator key. A key 3 can also present several sensors 1 also functioning independently of one another.

FIG. 1.4 shows a key 3 according to the invention which has, besides a sensor 1, also a triggering unit 4. The sensor 1 and the triggering units 4 are activated by differently long staying time v as well as by the differing direction r and speed g of fingers, hands, other parts of the body or objects brushing or sliding without contact over the sensor 1. The activated triggering units 4 release a stop when the requirements (prescribed) for them are fulfilled. Such demands can be in detail that the direct or indirect pressure on them is reached, exceeded or gone below, that the exerted pressure reaches a certain (staying) duration, exceeds this, or goes below this, that the fingers sliding or brushing over a particular triggering unit pursue a certain direction or do not pursue it or these movements reach a certain speed, or exceed or fall below this speed. Such a requirement can also exist in that the stroke of a triggering unit 4 is executed only when simultaneously or additionally one or arbitrarily many other triggering units are activated or struck. If the prescribed requirements are not fulfilled, then the stroke is omitted. With the stroke, either characters (individual letters, signs, etc.) are written, tones are generated or commands are executed. If the activation or the stroke of a triggering unit 4 is not associated with any perceptible noise, then a (signal) tone, a speech announcement or any other means for reporting back to the user can be generated, supported by electronic data processing, which is of significance especially in the use of keyboards for the handicapped.

FIG. 1.5 shows a key 3 with sensor 1 and triggering units 4 arranged one over the other. On actuation of the key 3, the first stroke occurs after fulfilling the demands B1 of the key unit 4.1 and thereupon, after fulfilling the demands B2 of the key unit 4.2. If two (as in FIG. 1.5) or more such triggering units 4 are present, then only the last stroke executed obtains validity, while the preceding strokes are automatically canceled. A key 3 forms in common with sensor 1 and triggering units 4 of the key unit 5.1.

FIG. 2.1 shows arbitrary (other) devices 31 (sliders, push buttons, etc.) for activating or triggering a process with the fingers, hands, parts of the body or objects. FIG. 2.2 shows a light barrier 31.2. On interruption of the light B3 of the light barrier 31.2 the sensor 1 is activated. FIG. 2.1 shows a lever 31.1, which on actuation to the right activates the sensor 1, on actuation to the left activates the triggering unit 4.

FIG. 3.1 shows the chord keyboard 2.2 on which with a single chord stroke several characters (for example syllables, abbreviations, words) can be struck. It has an arbitrary construction with, for example, a movable upper part 2.2' and an immovable lower part 2.2". The upper part 2.2' is pressed in the course of the chord stroke onto the lower part 2.2". On the upper part 2.2' there are present the key units 5.1, 5.2, which, provide at least one sensor 1. Furthermore, the chord has a central triggering unit 4 (possibly several such units; cf. FIG. 1.5). The functioning principle of the chord keyboard 2.2 can be variably executed with use of a stroke concept 6. Thus, the demands to be fulfilled of the key units 5.1, 5.2 and the central triggering unit 4 can be attuned to one another or act independently so that the keyboard 2.2 can be used, for example, for chord strokes and non-chord strokes; in the latter, there are used exclusively the key units 5.1, 5.2. In the envisioned chord stroke, first the individual characters that are part of the chord information are collected by actuating (activating, striking) of the key units 5.1, 5.2 and, in continuation of the key pressure (quasi-simultaneously) with the strokes on the key units (5.1, 5.2) as the chord stroke is struck on the central triggering unit 4 in a single total stroke. In this manner, it is possible to actuate the chord stroke in the pressing, instead of in the lifting-off of the fingers.

FIG. 4.1 to FIG. 4.4 show by way of example how the keys 3 are pressed with different members of the fingers and the triggering units 4 are struck in this manner. FIG. 4.1 shows the usual stroke (the "typing stroke") executed with the fingertips, while the stoke in FIG. 4.2 occurs with the fingerball of the forefinger member. Further positions (not shown here) for triggering elements 4 and sensors 1 can be present along the entire hand, in particular, below the ball of the hand, as well as, along the lower and upper arm, which is of importance especially in the case of special keyboards for the handicapped. In dependence on the particular type and intensity of the actuation, further technical provisions are also possible. Triggering units can be activated, for example, with the movements of the mouth, of the tongue, of the eyes or else with the breath of the user of the keyboard.

FIG. 5 shows by way of example a multiway key 7 in arbitrary execution. Key 7' is a multiway key 7 with characters which can be activated or struck (cf. 3'). Key 7" is a multiway key 7, as function key (cf. 3"). The multiway key can be pressed in two or more places. In dependence on the position of the key pressure, there occurs different activations and, accordingly, strokes. Key 7 of FIG. 5.1 has a rigid anchoring 8.1 and two triggering units 4.1, 4.2. On pressure Cd the anchored multiway key 7 tilts to the left and strikes the triggering unit 4.1, after fulfilling of the prescribed requirements C1$d$; on pressure Dd the anchored multiway key 7 tilts to the right and strikes the triggering unit 4.2. With two triggering units 4.1, 4.2 three strokes can be executed, since with pressure Ed and simultaneous fulfilling of the prescribed requirements on the triggering unit 4.1 and 4.1 an independent (additional) stroke comes about. FIG. 5 shows how by a combination of the functions of the multiway key 7 and of the sensor 1 there can be achieved a multiplication of the stroke possibilities. If it is a matter with the sensor 1, for example, of a pressure sensor which can be pressed with three different pressure intensities C (d1, d2, d3), then likewise many activations and therewith strokes can be executed after fulfilling of the requirements C1 (d1, d2, d3) of the triggering units 4.1. A multiway key 7 combines in operation with its triggering units 4 to provide the key unit 5.2.

FIG. 6.1 to FIG. 6.3 show by way of example the concerted acting of two keys for the realization of a certain stroke concept 6 which allows various-type formation possibilities. According to FIG. 6.1, the multiway key 7.1 has at its disposal a sensor 1.1 and a rigid anchoring 8.1. By applying pressure Fd, it is possible after fulfilling the prescribed requirement F1$d$, the triggering unit 4.1 can be struck, and by applying pressure Gd after fulfilling the prescribed requirement G1$d$, the triggering unit 4.2 can be stuck. The multiway key 7.2 likewise has at its disposal a sensor 1.2, but, in distinction from 7.1, has no rigid anchoring. By applying pressure Cd, after fulfilling the prescribed requirement C1$d$, the triggering unit 4.3 can be struck, and by applying pressure Dd, after fulfilling the prescribed requirement D1$d$, the triggering unit 4.4 can be struck and by applying pressure Ed, after fulfilling the prescribed requirements CE1$d$ and DE1$d$, an independent (additional) stroke can be executed without the presence of a triggering unit of its own. By applying pressure Hd, which is directed upon both multipurpose keys 7.1 and 7.2, after fulfilling the prescribed requirements GH1$d$ and CH1$d$, there is likewise achieved an additional stroke without the presence of a triggering unit of its own. The concept is laid out in such a way that a key inadvertently likewise pressed is automatically corrected or ignored. Thus, for example, a pressure is interpreted as applying pressure Hd even if besides the pressings Gd and Cd there were additionally applied still the pressures Dd and Ed. The pressures Dd and Ed are in this case ignored.

The sensor units 1.1 and 1.2 serve to reinforce the unambiguity of the key pressure by establishing the direction r of the finger movements. By such provisions there is required less precision of the stroke than that which would be required if the keys had to be pressed exclusively on the triggering units allocated to them. FIG. 6.2 shows a further example of the concerted action (Zusammenspiels) of two keys 3.1, 3.2. By applying pressure Cd, after fulfilling the prescribed requirement C1$d$, the triggering unit 4.1 may be struck and by applying pressure D, after fulfilling the prescribed requirements D1$d$, the triggering unit 4.2 may be struck. By applying pressure Ed, after fulfilling the prescribed requirements CE1$d$ and DE1$d$, an additional stroke may be achieved. FIG. 6.3 shows the same principle as FIG. 6.2, but in FIG. 6.3 a multiway key 7.3 with the sensors 1.3 and 1.4 is used. It has a movable (for example spring-supported) anchoring 8.2, which has a tilting and supporting function for the improvement of the clarity (unambiguity) of the strokes. The triggering units 4.1, 4.2 serve likewise for improving the clarity of the key pressure (cf. FIG. 6.1). A special advantage of the executions of FIGS. 6.1 to 6.3 lies in that the fingers are present in immediate proximity of the keys 3.1, 3.2, 7.1, 7.2, 7.3, so that the strokes can be executed with slight movements of the fingers.

FIG. 7.1 shows the use of a QWERTZ keyboard 9 with a picture screen 10. For this, as a rule, a special desk 11 is preferably required which is lower than a normal table, so that the lower arms 12 of the operator can be kept horizontal. In order to achieve an upright writing position 13, there is furthermore required a comfortable seat 14. The basic position of the fingers lies in the ten-finger system in the middle row of keys 15 of the keyboard 9. FIG. 7.2 shows the use of the relief keyboards 2.3, 2.4 according to the invention, into which the hand 16 of the user is embedded (cf. FIG. 8.1 to FIG. 8.8). The relief keyboards 2.3, 2.4 rest on an ordinary desk 17, so that the lower arm 12 assumes a comfortable writing position. Through the possibility of being able to support the arms in writing, no special seating arrangement is required.

FIG. 8.1 to FIG. 8.8 show diverse details of the two-hand relief keyboard 2.3 and of the one-hand relief keyboard 2.4. FIG. 8.1 shows the two-hand relief keyboard 2.3 from above. It is evident, inter alia, that keyboard 2.3 is divided into the two halves A* and B* FIG. 8.2 shows a section through the two relief keyboards 2.3, 2.4, which have at their disposal a front part 18.1, a rear part 18.2 and an intermediate part 18.3. In the front part 18.1, they are at first relatively low 19, but rise gradually with increasing distance from the user to 20, in order after the first apex point 21 to sink into a trough 22, in which the keys are located. At the lowest point of the trough 22 there is located the basic position of the fingers. From the base position, the relief keyboards 2.3, 2.4 rise (again) to a further apex point 23, in order to decline from this to the rear end 24. In the middle of the relief keyboard 2.3 there is present a recess 25 for the thumbs. On the lateral boundaries 26 of the recess 25 there are present thumb keys 29 (here only represented by suggestion; cf. FIG. 8.3 and FIG. 8.4).

FIG. 8.3 shows an enlarged and more-detailed representation of the relief keyboards 2.3, 2.4 according to FIG. 8.2. The example makes it possible to recognize the keys 3.3, 7.4, 7.5 present in the trough 22. The keys 3.3, 7.4, 7.5, which also have sensors 1 (not presented here), are allocated to the triggering units 4.5, 4.6, 4.7, 4.8, 4.9. The stroke concept 6 pursued in the example provides that with applying the pressure Id, after fulfilling the prescribed requirements I1$d$, the triggering unit 4.5 may be struck. Likewise, with applying the pressure Jd, Kd, Ld and Md, the triggering units 4.6, 4.7, 4.8 and 4.9 are struck on fulfilling the prescribed requirements J1$d$, K1$d$, L1$d$ and M1$d$. If both pressure Id as well as Jd are exerted, and the prescribed requirements IJ1d and JI1d are met, then, however, only the triggering unit 4.6 is struck. Pressure IJ1d is accordingly ignored. It is also possible in the case of applying simultaneous pressure of Kd and Ld, and fulfilling the prescribed requirements KL1d and LK1d, to allocate the stroke exclusively to a single one of the two triggering units 4.7, 4.8, as it is also possible, from these two pressures according to concept to provide a supplementary (additional) top therefore (not provided in the objective example). The thumb keys 29 in the two-hand relief keyboard 2.3 are located on the lateral boundary 26 of the recess 25, and in the one-hand relief keyboard 2.4 in vertical or oblique arrangement on the lateral end of this keyboard (cf. FIG. 3.5). The intermediate part 18.3 of the relief keyboards 2.3, 2.4 can be enlarged or reduced by shifting the two parts 18.1 and 18.2 on a bar 27—if need be also eliminated in the relief keyboard 2.3 for each of the two hands 16 separately and independently from one another (not represented here). Through the possibility of being able to vary the length of the intermediate part 18.3, the relief keyboards 2.3, 2.4 can be optimally adapted to the length of the user's hands. When the most favorable spacing has been found in this manner, then the intermediate part 18.3 is fixed with a fixing mechanism 27'. Thus, the resulting space of the intermediate part 18.3 is cast with a hardening material 28 and therewith filled. The casting mold takes into account the form of the inner hand of the user as well (it is included in the casting), so that parts of the surface 20, 21 of the keyboard are exactly fitted to the hands of the user.

FIG. 8.4 shows the same relief keyboards 2.3, 2.4 (cf. FIG. 8.3) over which there is located a casing 30 in arbitrary execution. On the inside of the casing 30, as well as in other arbitrary places above and below the fingers, hands, arms, etc., there are located diverse devices 31, such as, for example, levers 31.1, sliders, pushbuttons, etc., which may also be sensors 1.4 and which can be acted upon and struck or motioned upward by means of a finger, hand or arm movement (also above the thumb; not represented here).

FIG. 8.5 shows details of the relief keyboards 2.3, 2.4 from in front and in section and illustrates their device for adjusting the key unit 5.1, 5.2 in height and width. By means of an adjusting screw 32 or any other such mechanism, the height 33 and the key spacing 24 is exactly fitted to the user's hand. If in the fixing of the key spacing 34 there arise gaps or narrow places, then these can be filled by use of a smaller or larger key unit 5.1, 5.2.

FIG. 8.6 and FIG. 8.7 show executions of a relief keyboard 2.3, 2.4 which requires no additional support surface since it has at its disposal a bar 35 or any other such device which can be fixed on the arms of the user. These executions are suited especially as one-hand keyboards 2.4 for mobile use. FIG. 8.8 shows another such execution of the relief keyboard 2.3, 2.4 (cf. FIGS. 8.6 and FIG. 8.7) which is combined with a computer mouse 36.

FIG. 8.9 shows the thumb keyboard 29 which in the two-hand relief keyboard 2.3 is located on the lateral boundary 26 of the recess 25 and in the one-hand relief keyboard 2.4 in vertical or oblique arrangement at the lateral end of this keyboard (cf. FIG. 8.5). In flat executions of keyboards 2, the thumb keyboard 29 is adapted to the particular requirements given. The thumb keyboard 29 has at its disposal several individual keys 37, 38, 39, 40, 41, 42, 43, 44 with which it can be a matter of simple triggering sensor and triggering units 1, 4, of key units 5.1, 5.2 and of other arbitrary devices 31 (cf. levers 31.1 or sliders), which can be mounted on all arbitrary places reachable with the thumbs of the keyboard 2, thus also above the thumb 30 (cf. FIG. 8.4).

Also the thumb keyboard can have at its disposal the functional principle of the chord keyboard 22. The example according to FIG. 8.9 provides that the emptying, switch-over and canceling function is fulfilled by the key 37: the simple key pressure brings about an empty step which is accomplished on lifting-off of the finger; if the individual key 37 is held fast in activating (striking) of another key, then it fulfills the switch-over function, as it is usual in the QWERTZ keyboard 9. If the individual key 37 is struck once with a certain minimum hardness (hard-punch), then the individual key 37 fulfills an erasing (canceling) function (the last input character or the incompletely input word is erased). The individual keys 38 and 39 serve for the selection (Anwahlen) of additional keyboards. The individual key 40 serves for the line switching, the individual key 41 as tabulator key (normal key pressure) and as backspace key (hard-punch). The individual key 42 serves for the deactivating of the function automatic system of the keyboard 2, so that with it there can also be executed unusual strokes or commands. The individual key 43 serves as fixing or snap-in key, similar to the shift lock key of the QWERTZ keyboard 9. Individual key 44 is preferably a reserve and function key freely operatable by the user.

FIG. 9.1 shows the structure of the braille script in its usual variations. The braille structure 45.1 has eight braille points P1, P2, P3, P4, P5, P6, P7, P8, which are arranged in matrix fashion in four rows R1, R2, R3, R4 and two columns Ka, Kb. With eight braille points there can be represented 256 different braille characters. Now and then there occurs the use of a braille structure consisting of 7 points in which either the braille point P8 or P7 is lacking. The braille structure 45.2 has six braille points P1, P2, P3, P4, P5, P6 and accordingly three rows R1, R2, R3 and two columns Ka, Kb. With six braille points there can be represented altogether 64 different braille characters. In exceptional cases there comes in question also a braille structure consisting of five points. The braille structure 45.3 has four braille points P1, P2, P4, P5 which therefore presents two rows R1, R2 and two columns Ka, Kb. With four braille points there can be represented altogether 16 different braille characters. It serves especially for the representation of figures that do not require any larger number of braille points.

FIG. 9.2 shows the arrangement of the braille keys in a conventional braille keyboard to be operated with both hands. For each braille point P1, P2, P3, P4, P5, P6, P7, P8 there is provided a separate key. Deviating from the braille structure 45.1, the columns Ka and Kb are arranged separately and substantially horizontal. The keys are struck in the chord stroke, the stroke occurring on the lifting off of the fingers from the keys.

FIG. 9.3 and FIG. 9.4 show the key or stroke arrangement of the invention for a one-hand braille keyboard for left handers 47.1 and right handers 47.2. Between two columns Ka and Kb there are additional columns Kc. For the braille points P1, P2, P3, P4, P5, P6, P7, P8 and the point pairs P1+4, P2+5, P3+6, P7+8 there are accordingly twelve individual keys 3 with the 8-point braille structure 45.1 (with other braille structures correspondingly fewer or more). Instead of tie individual keys 3, however, there can also be used four multiway keys 7 with the 8-point braille structure 45.1 (with other braille structures correspondingly fewer or more), in which one multiway key 7 covers in each case a row R1, R2, R3, R4 and in this two individual points and one point pair (P1, P4, P1+4), (P2, P5, P2+P5), (P3, P6, P3+P6), (P4, P8, P4+P8). The braille points P1, P2, P3, P4, P5, P6, P7, P8 can be combined into arbitrary point pairs, but each individual row Rn must provide the strokes Pn1, Pn2 and Pn1+Pn2. Also the stroke principle of the chord keyboard 2.2 can be used with the one-hand braille keyboard.

We claim:

1. Keyboard comprising at least one key providing more than one reproducible character, a triggering unit operably disposed in connection with the key, and sensors arranged on the key, said key having at least two selectively actuated sensors, wherein each sensor generates at least one unique signal, each of said signals representative of one of said reproducible characters, said sensors interacting with a device for displaying said signals, and whereby a response behavior of an actuation of the sensors is different from that of the triggering unit to provide means for displaying one of said unique signals before a final triggering of a final signal by means of actuating said triggering unit.

2. Keyboard according to claim 1, characterized in that the sensors and the triggering unit comprise different actuation pressures.

3. Keyboard according to claim 1, characterized in that the sensors and the triggering unit comprise different actuation speeds.

4. Keyboard according to claim 1, characterized in that the sensors and the triggering unit comprise different actuation directions.

5. Keyboard according to claim 1, characterized in that the sensors and the triggering unit comprise different staying durations in an actuation.

6. Keyboard according to claim 1, characterized in that the triggering unit comprises means for delivery of an impulse at an end of an actuation of the key.

7. Keyboard according to claim 1, wherein said device comprises a monitor, said monitor displaying said reproducible character which corresponds to the key touched by a user, there preferably occurring a gating of the character into a display window.

8. Keyboard according to claim 1, wherein said device comprises an acoustic indicating arrangement for representing said reproducible character which corresponds to the key touched by a user.

9. Keyboard according to claim 1, further comprising a storage unit for text components, abbreviations or the like, which on actuation of the sensor of said key brings into display various text components allocated to the key, which are then selectable by actuation of a further key.

10. Keyboard according to claim 1, characterized in that the triggering unit can display different signals in dependence selectively on pressure or speed of an actuation.

11. Keyboard according to claim 1, wherein said reproducible character is selected from a plurality of optional characters associated with said sensors.

12. Keyboard according to claim 11, wherein said optional characters are selected by a user from a group consisting of letters, numerals, braille points, symbols, or command functions.

13. Keyboard as in any of claims 1–6 or 8, further comprising a generation of braille characters of an eight-point braille structure, wherein twelve keys are provided, of which eight of the keys are provided for a generation of individual points and four of the keys are provided for a generation of point pairs.

14. Keyboard according to claim 13, further comprising twelve keys arranged in four rows, in each row there being arranged two keys for the generation of an individual point each, as well as a further key for the generation of a point pair composed from these points.

15. Keyboard as in any of claims 1–6 or 8, further comprising twelve keys, four of said twelve keys including three actuation possibilities.

16. Keyboard as in any of claims 1–6 or 8, further comprising a generation of a six-point braille script including nine keys arranged in three rows.

* * * * *

UNITED STATES PATENT AND TRADEMARK OFFICE
CERTIFICATE OF CORRECTION

PATENT NO. : 5,627,566

DATED : May 6, 1997

INVENTOR(S) : Dietmar Litschel

It is certified that error appears in the above-identified patent and that said Letters Patent is hereby corrected as shown below:

At column 1, line 43, please delete "0f", and insert therefor -- of --.
At column 2, line 63, please delete "OWERTZ", and insert therefor -- QWERTZ --.

At column 6, line 7, please delete "D," and insert therefor -- Dd, --.
At column 6, line 41, after "B*", insert -- . --.

Signed and Sealed this

Twenty-sixth Day of August, 1997

*Attest:*

BRUCE LEHMAN

*Attesting Officer*   *Commissioner of Patents and Trademarks*